United States Patent [19]

Small

[11] Patent Number: 4,513,419
[45] Date of Patent: Apr. 23, 1985

[54] DIGITAL CONVERSION CIRCUIT AND METHOD FOR TESTING DIGITAL INFORMATION TRANSFER SYSTEMS BASED ON SERIAL BIT COMMUNICATION WORDS

[75] Inventor: Vincent J. Small, Kent, Wash.

[73] Assignee: The Boeing Company, Seattle, Wash.

[21] Appl. No.: 436,427

[22] Filed: Oct. 25, 1982

[51] Int. Cl.³ .............................................. G06F 11/00
[52] U.S. Cl. .................... 371/29; 324/73 R; 340/146.2; 371/25
[58] Field of Search ................. 371/29, 25, 15, 20; 324/73 R; 340/146.2

[56] References Cited

U.S. PATENT DOCUMENTS

| | | |
|---|---|---|
| 3,025,349 | 3/1962 | Peterson . |
| 3,274,379 | 9/1966 | Hinrichs . |
| 3,277,447 | 10/1966 | Newman et al. . |
| 3,582,882 | 6/1971 | Tikomb ............................ 340/146.2 |
| 3,651,481 | 3/1972 | Evans et al. . |
| 3,662,373 | 5/1972 | Schumann . |
| 3,752,917 | 8/1973 | Foley et al. . |
| 3,772,680 | 11/1973 | Kawai et al. . |
| 3,787,819 | 1/1974 | Busink . |
| 3,796,834 | 3/1974 | Kuhar, Jr. . |
| 3,858,196 | 12/1974 | Vrabel et al. . |
| 3,887,869 | 6/1975 | Connolly et al. ................. 324/73 R |
| 3,891,982 | 6/1975 | Cheek et al. . |
| 3,920,919 | 11/1975 | Aillet . |
| 3,971,011 | 7/1976 | Borchert . |
| 4,044,345 | 8/1977 | Ueda et al. . |
| 4,101,903 | 7/1978 | Slay . |
| 4,166,271 | 8/1979 | Thirlwall et al. . |
| 4,227,175 | 10/1980 | Newman . |
| 4,257,068 | 3/1981 | Johnston . |
| 4,375,635 | 3/1983 | Leow et al. ......................... 371/25 |
| 4,393,498 | 7/1983 | Jackson et al. ..................... 371/20 |
| 4,434,488 | 2/1984 | Palmquist et al. .................. 371/29 |
| 4,441,074 | 4/1984 | Bockett-Pugh et al. ......... 324/73 R |

Primary Examiner—Jerry Smith
Assistant Examiner—Mark Ungerman
Attorney, Agent, or Firm—Christensen, O'Connor, Johnson & Kindness

[57] ABSTRACT

A circuit and method are disclosed for testing line replaceable units (LRUs) and interconnect buses of an avionics system in which the various LRUs exchange information by means of transmitting and/or receiving digital communication words, each word having a predetermined, standardized serial bit format. A stream of communication words, each comprised of a predetermined number of bits, is serially received and converted to parallel format by a shift register that cooperates with a word counter also coupled to the stream of words, so as to output successively and in parallel format, each communication word. A general purpose digital data analyzer is used to display the binary form of each parallel bit word, and to decode and display the engineering and numeric data contained therein. The order of a certain field of bits of each word representing a word label is reversed in the shift register to enable direct decoding of the label by the data analyzer. Predetermined words can be selected from the stream for display and further analysis by means of a label detector cooperating with a label comparator and select switches which monitor certain parallel outputs of the shift register.

8 Claims, 6 Drawing Figures

| ALTITUDE | FUNCTION | BIT NO. | EXAMPLE |
|---|---|---|---|
| | (EV.) PARITY (P) | 32 | 1 |
| | SIGN/STATUS MATRIX (SSM) (NL) | 31 30 | 1 1 |
| | + SIGN FOR BNR | 29 | 0 |
| | DATA FIELD (13107.0 FEET) | 28 27 26 25 24 23 22 21 20 19 18 17 16 15 14 13 12 | 1 1 1 1 1 1 1 1 1 1 1 1 1 1 1 1 0 |
| | SPARE | 11 | 0 |
| | RESERVED (SDI) | 10 9 | 0 0 |
| | LABEL (OCTAL 203) | 8 7 6 5 4 3 2 1 | 1 0 0 0 0 0 1 1 |

Fig. 2.

DIGITAL CONVERSION CIRCUIT AND METHOD FOR TESTING DIGITAL INFORMATION TRANSFER SYSTEMS BASED ON SERIAL BIT COMMUNICATION WORDS

BACKGROUND OF THE INVENTION

The invention disclosed herein pertains to digital test equipment for verifying the proper operation of, and trouble shooting, digital subsystems that communicate over interconnect buses by means of standardized, multibit, serial communication words.

The invention primarily concerns apparatus and method for testing digital information exchange systems, such as found in digital avionics systems that are comprised of numerous line replaceable units (LRUs). Each LRU in the avionics system constitutes a replaceable electronics component, and each of these components communicates with others in the avionics system by means of transmitting and receiving digital information formatted in standardized multibit serial words that are recognized by the built-in intelligence of each LRU. For example, an LRU may sense the altitude of the aircraft and electronically formulate a digital serial word that, among other things, includes a binary representation of the engineering value of the altitude. Whereafter, the thusly formulated digital word is transmitted to another LRU which, for example, might be a digital readout on the instrument panel of the cockpit. There, the altitude data of the word is decoded and displayed on the readout in decimal notation or other pilot readable form.

While the LRU altimeter is but one example of a line replaceable subsystem, it will be appreciated that the actual avionics systems in large sophisticated aircraft of today involve many diverse LRUs which are interconnected by the digital buses to form a complex intelligence system. Because of the complexities and scale of such avionics systems, the aircraft industry has taken steps to standardize the digital words that are transmitted and received by the various LRUs so as to facilitate the interchageability of and maintenance of such components.

One aspect of this standardization is that the information transmitted and/or received by the LRUs is in the form of serial bit communication words, wherein each word includes a data field comprising the engineering or numeric content and/or discretes a label constituting another subgroup of bits and defining the function of the word (e.g., altitude) and certain other subgroups and single bits representing ancillary information. An example of such a standardized digital information word is specified in a publication prepared by Aeronautical Radio, Inc. of Annapolis, Md., entitled "Mark 33 Digital Information Transfer System (DITS) Specification No. 429-4," published Aug. 1, 1980, the contents of which are incorporated herein be reference. The communication word described in Specification No. 929-4, and known in the industry as the ARINC 429 word, is comprised of 32 bits in a standardized format which, as explained more fully hereinafter, can be used to represent over 300 different functions or parameters generated and/or received by commonly employed LRUs of an avionics system. Altitude was mentioned above, and other examples are latitude/longitude, ground speed, magnetic heading, wind speed, runway heading, vertical speed, frequency radio navigational signals, etc. The information carried in the various 32-bit communication words flow from one LRU port to one or more other LRU ports over a twisted, and preferably shielded, pair of wires in which only unidirectional serial flow of the digital word or words is permitted. Thus, when two LRUs require bidirectional communication, they will be coupled by at least two separate sets of twisted wire pairs.

Usually, a designated twisted wire pair serves as a common data but interconnecting a number of functionally related LRUs, hence, that bus will carry a number of different communication words, one for each of the parameters that is to be exchanged. For example, a single bus may carry communication words representing the parameters of latitude, longitude, ground speed, magnetic heading and wind speed. These different communication words will be transmitted successively on a given bus, but not necessarily in a predictable order. Because of the numerous parameters and associated communication words that may be present on any given bus, it becomes very difficult to analyze the digital data that appears on the bus and, hence, verification of LRU operation, trouble shooting and maintenance commensurately difficult.

To a large extent, these and other related problems are solved by an earlier invention disclosed and claimed in pending U.S. patent application, Ser. No. 227,371, for "APPARATUS FOR TESTING DIGITAL COMMUNICATION BUSES," now U.S. Pat. No. 4,393,498 filed Jan. 22, 1981, by T. Jackson et al. Disclosed in that application is an apparatus that not only receives and analyzes communication words appearing on a subject bus, but also enables test communication words to be generated and transmitted onto a bus for analyzing and verifying the response characteristics of the recipient LRUs. While the test apparatus disclosed in application, Ser. No. 277,371, now U.S. Pat. No. 4,395,498, meets the objectives sought by the inventors of that equipment, nevertheless there is a need for a less sophisticated, cost effective testing apparatus for performing some, but not all, of the test capabilities described in Ser. No. 227,371 now U.S. Pat. No. 4,393,498.

In particular and pertinent to the present invention, there is a need for test equipment that is conceived specially for analyzing communication words that appear or an interconnect bus and, in particular, has the capability of receiving, identifying and extracting (for analysis) individual communication words from the bus on a label-by-label basis. Such analysis may, for example, involve the isolation and decoding of the word data field which contains the engineering, numeric and/or discrete information.

Additionally, it is desirable to provide the capability in such a testing apparatus for receiving, decoding and displaying a list of the labels of all communiction words present on a given bus. Moreover, these capabilities are preferably performed by a test apparatus that makes efficient use of general purpose test equipment, such as a commercially available data analyzer and oscilloscope.

SUMMARY OF THE INVENTION

Accordingly, in test apparatus for checking out and trouble shooting systems of the type that communicate by transmission and reception of electrical communication words formed by a series of bits, a circuit is provided by receiving and converting these communication words to a parallel format and feeding such reformatted words to utilizing equipment, such as a conventional data analyzer. The circuit in general comprises a receiving unit adapted to be coupled to a communication bus for responding to a sequence of serial communication words thereon and for separating therefrom a data signal component and a clock signal component. A serial to parallel shift register is connected to receive the sequence of serial bit information contained in the data component which is clocked into the shift register by the above-mentioned clock signal component. One predetermined section of the shift register incorporates means for reversing the serial order of a field of bits of the communication words corresponding to a word label such that this particular field of bits appear at the parallel output of the shift register in reverse order relative to the other bit fields. Also connected to the receiving unit is a word detector responsive to a predetermined number of bits for detecting when a complete communication word has been loaded into the shift register. Once a complete word has thus been detected, a word loaded signal is produced which is communicated along with the parallel outputs of the shift register to the utilizing equipment, such as the above-mentioned data analyzer.

In the preferred form of this invention, the above-mentioned circuit further comprises a multibit label comparator, a label detector and a set of label select swtiches which are cooperatively arranged to accept an operator input of a selected label and to compare the selected label with each word label entered into the shift register. Whenever a match occurs between a label selected on the label select switches and a received word label, a trigger signal is produced for application to utilizing equipment, such as an oscilloscope connected to display the timing and wave form of the communication word having the matching label.

In accordance with the method of the invention, the serial bit communication words are received, in succession, and the data and clock components of each of the words are separated to respectively represent the data and bit rate of such data. The serial data are converted into parallel format by a shift register clocked by the bit rate and the order of occurrence of a certain field of data bits extracted from the communication bus are reversed during the conversion from serial to parallel format. In cooperation with the serial to parallel conversion step, each complete communication word is detected by counting the number of clock signals that occur after a predetermined timing gap between successive communication words, and a word loaded signal is produced upon detecting the conversion of a complete word. The readiness of the reformatted communication word is thus signaled by the word detection step, enabling a downstream data analyzer to display and decode the reformatted communication word.

To provide a complete disclosure of the invention, reference is mde to the appended drawings and the following description of one particular and preferred embodiment.

BRIEF DESCRIPTION OF THE DRAWINGS

FIG. 2 is a chart of one example of a standardized communication word received by the conversion circuit of FIG. 1, and showing the relationship between the sequence of serial bits and the information represented thereby including the data field shown in engineering (decimal) notation, the word label field in octal and ancillary information.

DETAILED DESCRIPTION OF PREFERRED EMBODIMENT

Figure 1:
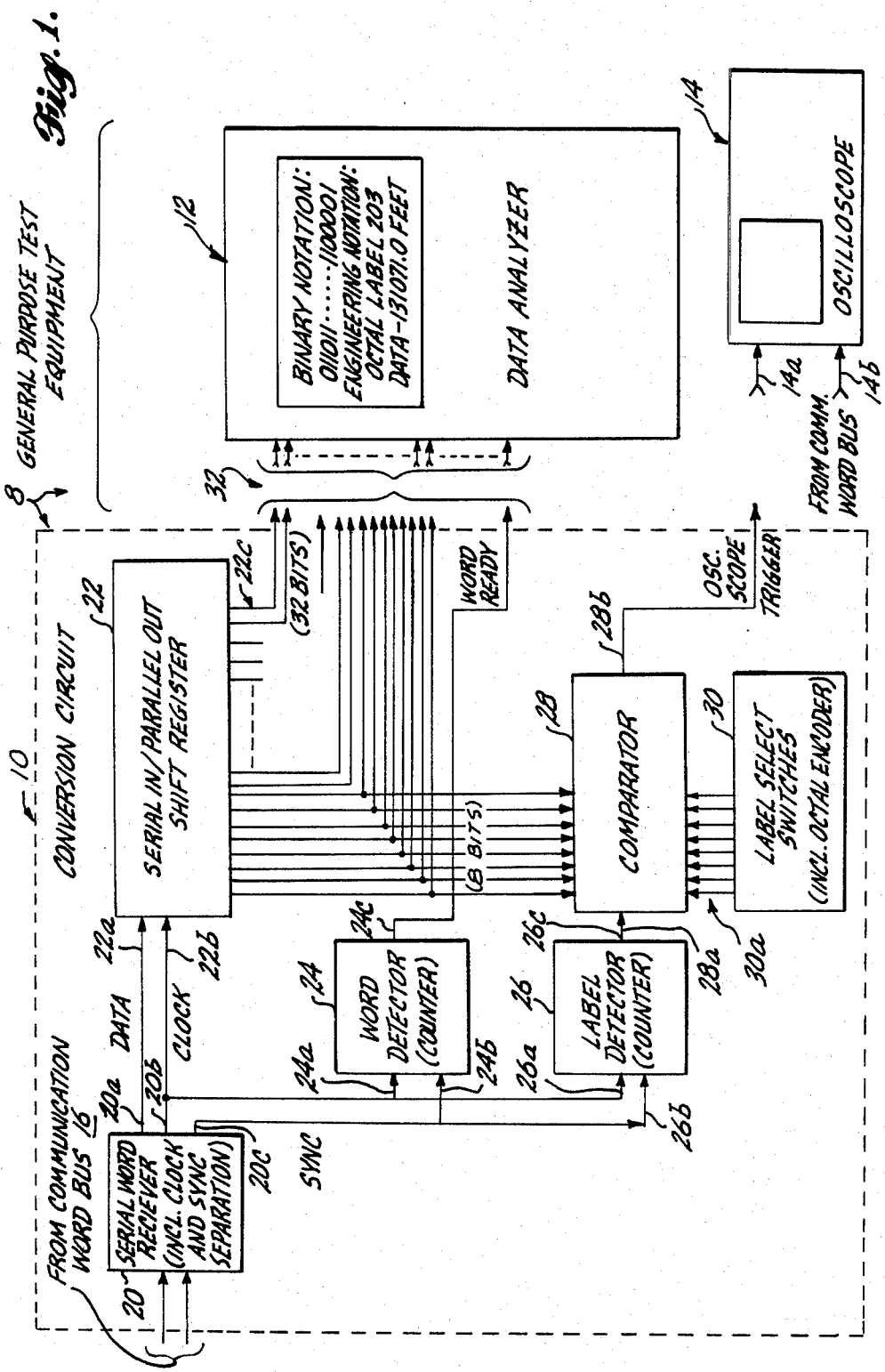
FIG. 1 is a detailed, block diagram of the conversion circuit in accordance with a preferred embodiment of the invention, shown in cooperation with general purpose test equipment including a conventional data analyzer and an oscilloscope.

With reference to FIG. 1, a conversion circuit 10 adapted for use in a test apparatus 8 receives and reformats digital communication words of the type characterized above so that each such word can be isolated and further analyzed by such equipment as a data analyzer 12 and an oscilloscope 14 connected to circuit 10. The communication words converted by circuit 10 have a predetermined number of serial bits containing binary encoded information and occurring in succession on bus 16 which, for example, may interconnect a plurality of LRUs of an avionics system. As an example, the disclosed circuit 10 operates on a 32-bit communication word having a standardized format specified by the above-mentioned ARINC Specification No. 429-4 and referred to hereinafter as the ARINC 429 word. The contents of this 32-bit word are further described below in connection with FIG. 2. Briefly, the bits of each word are grouped in fields according to the following functions: parity, sign/status matrix, data field, source/destination indicator and label. The data associated with these functions always occur at the same bit locations of the 32-bit sequence.

In general, conversion circuit 10 receives the stream of bits of the successive communication words on but 16 and converts each 32-bit series into a parallel word output and an accompanying word ready output for signaling data analyzer 12 to decode and display the associated information. Additionally, circuit 10 includes a label recognition function for enabling circuit 10 in conjunction with oscilloscope 14 to look for and display the wave form and, hence, timing of each occurrence of a particular word for which the associated label has been preselected using manually operated select switches in circuit 10.

More specificlly, conversion circuit 10 includes a serial word receiver 20 having an input coupled to bus 16 and having outputs providing data, clock and sync components; a serial-in/parallel-out shift register 22 having serial inputs coupled to the data and clock component outputs of receiver 20 and having parallel outputs adapted to be connected to the corresponding parallel inputs of data analyzer 12; and a word detector 24 provided by a counter having inputs connected to the clock and sync components from receiver 20 and having an output producing a word ready signal when register 22 has been loaded with a complete communication word.

Additionally, conversion circuit 10 in its preferred form incorporates a label detector 26, a label comparator 28 and a bank of label select switches 30 cofunctioning to produce a trigger signal at an output of comparator 28 for 6pplication to an oscilloscope 14 to display the wave form of the selected word.

Receiver 20 is a conventional interface module found in avionics systems using the ARINC data bus standard and operates to receive the data stream on bus 16 and produce at a first output 20a the data components of the communication words in the form of transistor-to-transistor logic (TTL) and nonreturn to zero (NRZ) form. At a second and separate output 20b, the clock component of the data bit stream is produced, also in TTL logic form; and at a third output 20c, a synchronization (SYNC) component is produced, also in TTL form, and representing the gap between successive multibit communication words.

On bus 16, the data in each word is in the form of a differential signal in which a "1" is represented by a positive-going pulse that thereafter returns to a reference level and a "0" bit is represented by a negative-going pulse that similarly returns to a reference voltage. The clock component is the uniform sequence of pulses of one polarity having a rate and phase determined by the stream of positive- and negative-going data pulses. Between successive communication words, a minimum gap of four bits duration occurs, and receiver 20 detects the absence of data bits during this interval by means of a "one shot" that is repetitively reset so long as data pulses are present and "times out" in response to the gap in the bits to produce the synchronizing signal component. Thus, the sync component signal will normally occur at or close to a time equal to the width of two data bits after the trailing edge of the last data bit of a given communication word.

Serial-in/parallel-out shift register 22 is a conventional device except that, in the preferred embodiment, a certain segment of register 22 is conditioned to reverse the normal serial-in order of a field or subgroup of bits to facilitate decoding of the word label by data analyzer 12, as described more fully hereinafter in connection with FIG. 4. At an input 22a of register 22, the data, in NRZ form, is clocked into the register sections by the clock component signal applied to an input 22b. The 32 bits of parallel outputs 22c are accessible at an output interface of circuit 10, such as by means of a connector indicated at 32, for plug-in connection to a data analyzer 12.

Word detector 24 is in essence a counter having an input 24a connected to accumulate (count) the clock pulses from receiver 20 and having a reset input 24b that resets the counter to zero each time a word sequence has been completed as represented by the occurrence of a sync signal from the receiver output 20c. Each time detector 24 is reset by the sync signal, a detector output 24c produces a word ready signal that is applied through connector 32 at the output of conversion circuit 10 to a data load input of data analyzer 12.

Label detector 26 is another counter having a counting input 26a and a reset input 26b for accumulating a count corresponding to a predetermined number (namely 8) of bits that occur at the beginning of each word and that define the ARINC label. An output 26c of detector 26 develops a detected label output signal in response to each completed word label passing through receiver 20, and applies the detected label signal to an enable input of comparator 28 instructing comparator 28 to perform a comparison between certain bits of outputs 22c of register 22 and a corresponding number of bits selected by switches 30. As described more fully below, the eight output bits of register 22 applied to comparator 28 are the first eight bits serially loaded into register 22 and the label detected signal at output 26c of detector 26 occurs at a time when these eight label bits have been entered into the first eight slots of register 22. Note that the final position of these eight label bits in the complete word, after it has been fully loaded into register 22, will be disposed in the last eight slots of register 22 and, hence, associated with the eight parallel outputs adjacent the right-hand end of the register, as viewed in FIG. 1.

Switches 30 produce a set of eight label bits selected by an operator using switches 30. In this embodiment, a set of three thumb switches are provided (not shown), each having eight positions and being associated with an octal encoder within swtiches 30 that automatically encodes the octal outputs of the three thumb switches into an eight-bit binary encoded label for direct comparison with the corresponding eight word label bits from register 22. The octal encoded output of switches 30 is indicated at 30a. Comparator 28, in response to the label detect signal received at input 28a, compares the bus label with the operator selected label and, if a match is present, a trigger signal is produced at an output 28b. The trigger signal on output 28b may be applied to a trigger input 14a of oscilloscope 14 which also has a data display input 14b adapted to be connected to the same communication word bus 16 that produced the serial stream of label bits applied in parallel form to comparator 28 via register 22.

COMMUNICATION WORD

To aid the reader in understanding the operation of the test apparatus of FIG. 1, reference is made to the chart in FIG. 2 of an ARINC 429 word and to the following description thereof. The ARINC 429 communication word shown in FIG. 2 is used to represent the altitude parameter. The binary encoded form of the word is shown along the lowermost row as a structured 32-bit digital word commencing with the bit location 1 on the right-hand side of the chart and increasing in the order shown from right to left to the final bit location 32 on the far left side of the chart.

The 32 bits are divided into subgroups: a LABEL, occupying bit locations 1–8, which when decoded to engineering notation is an octal three digit number such as here shown as 203, which represents the altitude parameter; a source, destination indicator (SDI) occupying bit locations 9 and 10 and representing, where needed, the source (LRU) or destination (LRU) of the word; a data field occupying bit locations 11–29 and including one or more spares, if not required, such as here shown by the spare at bit 11 (in the case of a parameter encoded in true binary (BNR) bit location 29 of the data field is used as a sign indicator, and for this parameter, the zero at bit 29 represents a plus sign); a sign/status matrix (SSM) at bit locations 30 and 31 for representing the sign and certain status conditions of the parameter when encoded in binary coded decimal (BCD) and representing the status of the word when the parameter is encoded in true binary (BNR); and a final bit location 32 that determines the parity—odd or even of the complete binary word.

The data field in this example, when decoded to engineering notation, corresponds to an altitude of +131,071.0 feet. The 1s at bit locations 31 and 32 for the SSM represent in this case a normal test indicated by the letters NL, and the parity determining bit 32 causes the word as a whole to be of even parity.

It will be appreciated that the chart shown in FIG. 2 for the altitude parameter, is but one example of several hundred different parameters which are capable of being represented by the standardized 32-bit word in accordance with the ARINC 429 specification. For example, other parameters are: latitude (octal label code 010), longitude (011), magnetic heading (014), ILS frequency (033), VOR/ILS frequency (034), DME frequency (035) and MLS frequency (036).

The engineering and numeric data associated with these various parameters is in general encoded into (and decoded from) the 32-bit digital word using either of two basic codes, binary coded decimal (BCD) or true binary (BNR). The conversion of the communication word between engineering form and binary form and vice versa requires a determination of whether the particular parameter is a BCD word or a BNR word. One example of the different treatment of the engineering-to-binary conversion is found in the meaning of the SSM bit locations 30 and 31 and in bit 29 of the data field. For BCD encoded data, the two bits at locations 30 and 31 are used as a matrix to represent the sign (±) and sign-like condition for the associated data field wherein 0s at bits 30 and 31 correspond to conditions of plus (+), north, east, right, to and above, and 1s at these bit locations represent minus (−), south, west, left, from and below. For the BCD encloded data, the highest order bit 29 of the data field is used as part of the data field per se in encoding the engineering values and not as a sign indicator. On the other hand, when the data are encoded in true binary, BNR, then the sign and sign-like indicators for the data are represented by the bit condition at location 29 of the data field, as in the above example of the altitude parameter, and the SSM bit locations 30 and 31 represent various status conditions of the system including 0,0-failure warning; 0,1-no computed data; 1,0-functional test; and 1,1-normal operation.

In addition to the BCD and BNR encoded data, certain other code forms and packed discretes are accommodated by ARINC specification 429; however, these are not pertinent to the disclosure of the invention and have been omitted from the present discussion.

For the purpose of disclosing the preferred form of the invention, it will be appreciated that the communication words appearing on bus 16 (FIG. 1) contain a predetermined, uniform number of bits, such as the 32 bits in the ARINC word, and that predetermined subgroups of bits within each word contain encoded, engineering and numeric information such that general purpose test equipment, such as data analyzer 12, can be used to display the word in binary notation, and when appropriate, decode the binary notation and display the resulting engineering notation. In this regard, it will be recognized that the present invention pertains principally to the circuit and method of converting a succession of serial bit words into a parallel bit format, and to determine the presence of certain preselected words by detecting the occurrence of the word label represented by a predetermined subgroup of bits having a known position within the complete word.

TEST SETUP

Figure 3:
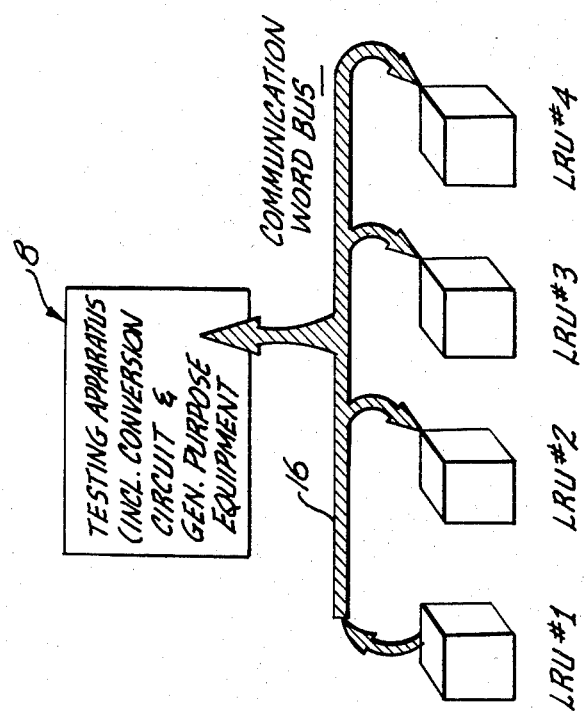
FIG. 3 is a block diagram showing a typical test setup in which a plurality of LRUs are connected to a common communication word bus and the testing apparatus, including the conversion circuit and test equipment of FIG. 1, is coupled to the bus for extracting and analyzing the communication words appearing thereon.

With reference to FIG. 3, an example of a typical arrangement of the testing apparatus, including conversion circuit 10 and test equipment 12, is shown in relation to a plurality of LRUs 1-4. The LRUs of the test setup are interconnected by a communication bus 16 and LRU 1 is shown to be transmitting one or more communication words to each of the other LRUs 2, 3 and 4 interconnected by bus 16, as well as to testing apparatus 8.

SERIAL-IN/PARALLEL-OUT SHIFT REGISTER

Figure 4:
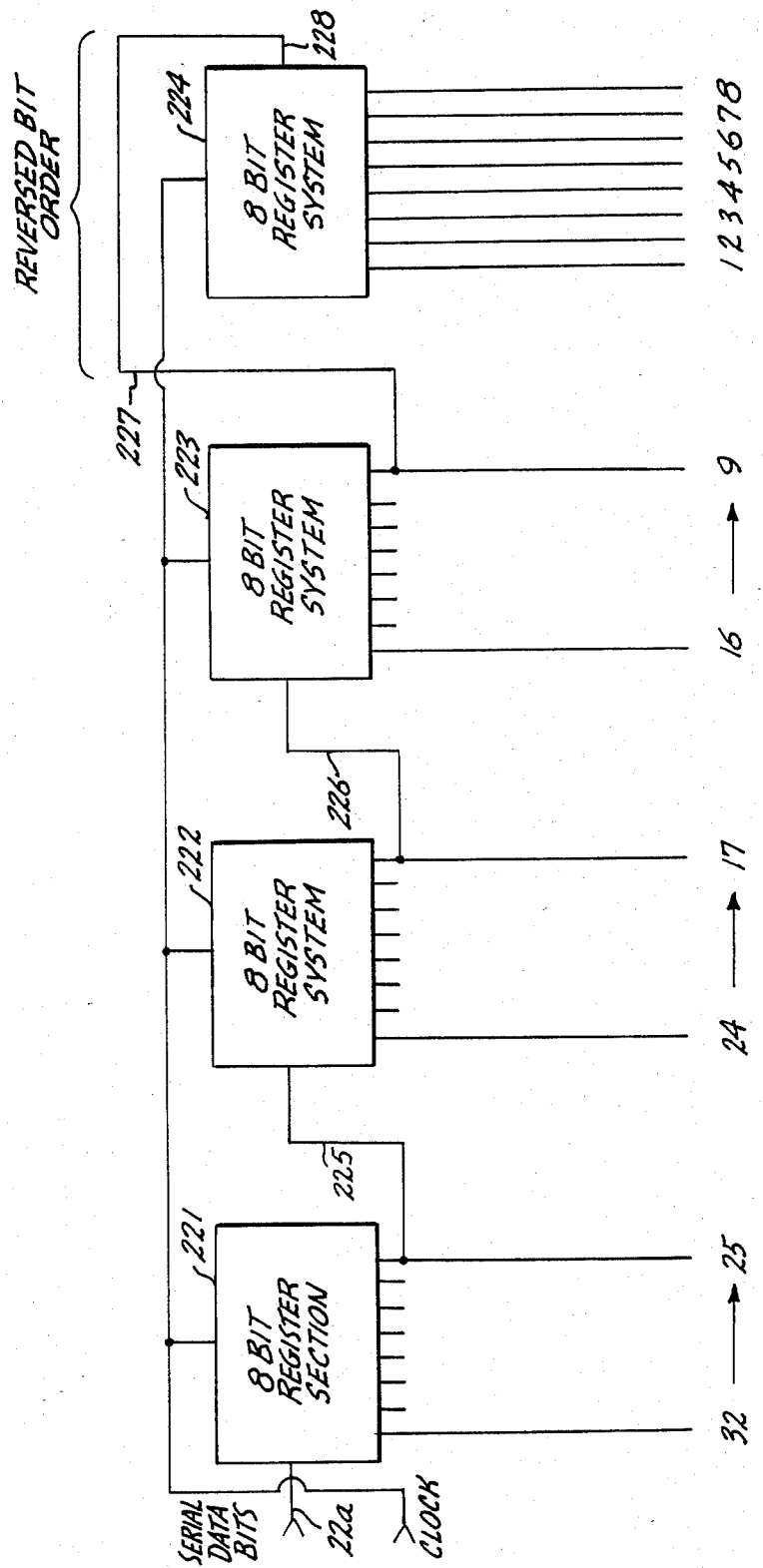
FIG. 4 is a detailed schematic diagrm of a serial-in/parallel-out shift register of the conversion circuit of FIG. 1.

With reference to FIG. 4, a detailed schematic of serial-in/parallel-out shift register 22 is shown to be provided in this embodiment by a plurality of register sections 221, 222, 223, and 224; each such register section having an eight-bit capacity. Register sections 221-224 are cascaded starting at input 22a which accepts the serial data component from receiver 20 (FIG. 1) and applies same to the data input of register section 221. The overflow at the terminal output register section 221 is applied to the data input of register section 222 via interconnect 225 and likewise with register section 222 having the overflow at its terminal output applied to the data input of data register section 223 over interconnect 226. The last eight-bit register section 224 is connected to the preceding section 223 so as to reverse the normal bit order of the parallel outputs of register section 224 by applying the overflow output of section 223 via interconnect 227 to a data input 228 at the opposite end of register section 224 from the normal data point. Hence, the first eight bits of the 32-bit communication word are the last to be loaded and are stored in register section 224 in reverse order relative to the serial order in which these bits occur on bus 16 to enable straightforward decoding (as described below in the section on operation) by the downstream general purpose test equipment, including data analyzer 12.

Hence, the parallel outputs of register sections 221-224 present the 32 bits of the loaded communication word in the following order: bit positions 32-25 appear in decreasing output order from left to right at the eight parallel output of register section 221; bit positions 24-17 in decreasing order at the outputs of section 222; bit positions 16-9 in decreasing order at the outputs or register section 223; and bits 1-8 appear in increasing order from left to right at the eight parallel outputs of the final register section 224 and hence are in reverse output order relative to the subsequently loaded bits 9-32.

OPERATION

With conversion circuit 10 connected as shown in FIG. 1 between bus 16 and the general purpose test equipment including data analyzer 12 and oscilloscope 14, a succession of serial bit words appearing on bus 16 are extracted therefrom and are made available in parallel format at the interface connector 32. Data analyzer 12 responds to each word ready signal produced by word detector 24 to load the 32-bit parallel word at connector 32 into a buffer memory contained in analyzer 12. In this particular embodiment, analyzer 12 is provided by a commercially available device having a 64 word storage capacity in a buffer memory such as provided by Model 1610 Data Analyzer available from the Hewlett Packard Company of Palo Alto, Calif. Thus, a succession of words on bus 16 will be reformatted, one at a time, and loaded by the word ready signal, produced at the end of each word bit series, into the multiple word buffer memory of data analyzer 12. The 32-bit words thusly stored in the buffer memory of analyzer 12 are then processed by analyzer 12, in a manner known per se. For example, each 32-bit word may be display in binary notation, and selected bit fields of each word decoded and the decoded information in engineering notation displayed such as indicated in FIG. 1 for the altitude parameter as "octal label—203" and "data—131071.0 feet." The altitude value used here illustrates, by way of example, the full range capability of the data field; in actual flight conditions, the measured altitude will, of course, be much less than indicated. The conditioning of data analyzer 12 to decode the various bit fields of each word is performed in accordance with the ARINC 429 word standard: the initial eight bits are decoded from binary to octal; and the data field may be decoded to decimaal from binary coded decimal, or remain in binary when the data field is composed of discretes in which case the discretes are displayed directly.

Data analyzer 12 may be used in two different modes. In one mode, a selected label is entered into data analyzer by an operator and an analyzer 12 is thereby conditioned, in accordance with its known operation, to latch words appearing at the output of conversion circuit 10 having the selected label and to display and decode the information in those words. In a second mode, analyzer 12 will accept up to 64 words, sequentially storing these parallel bit words as they are presented at the output of conversion circuit 10. After 64 words are stored, the data analyzer will automatically stop, retaining the 64 words in the buffer memory for further processing by the analyzer in the manner described above.

Figure 5:
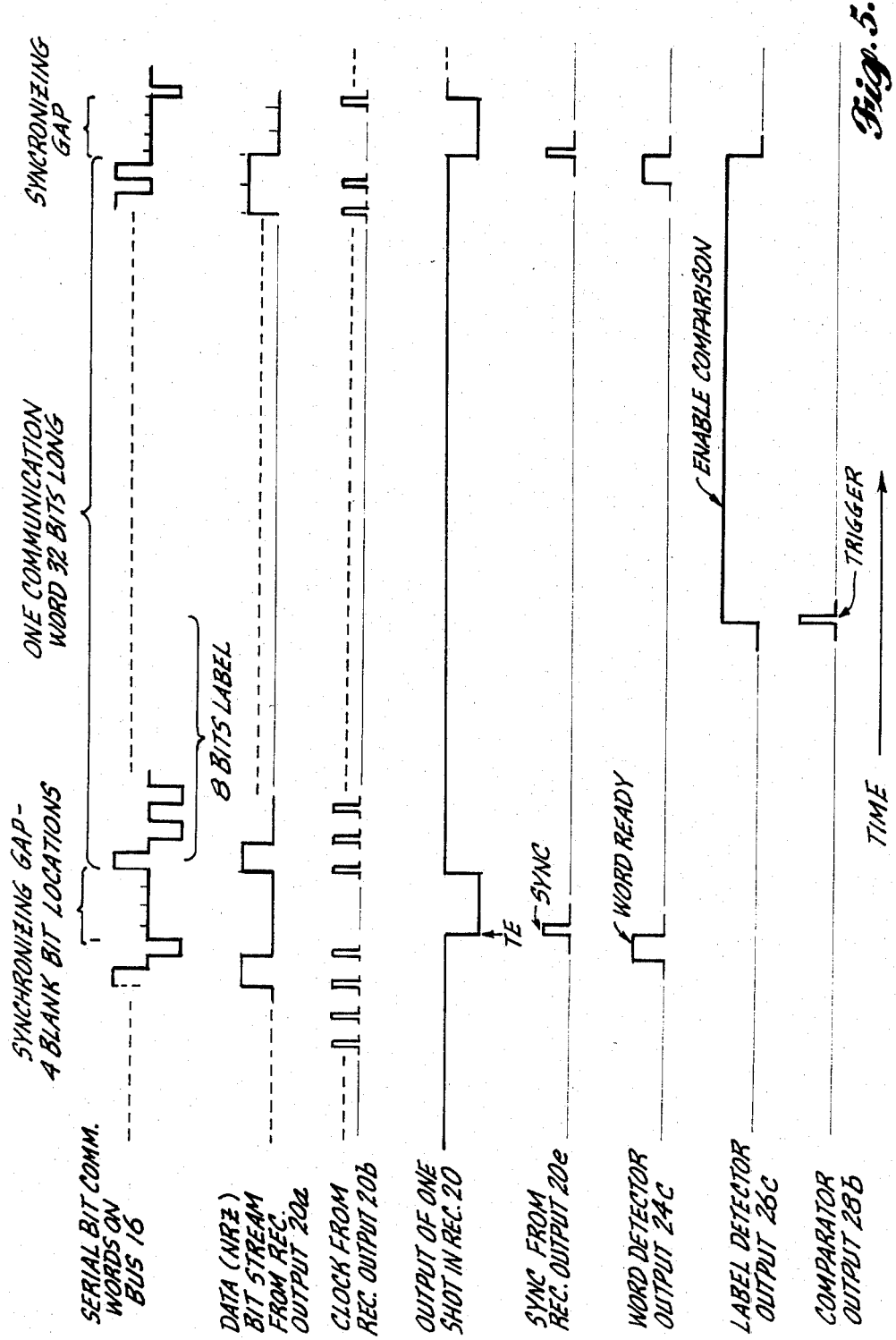
FIG. 5 is a timing and wave form diagram showing the timing relationship between various signals present during the operation of the conversion circuit of FIG. 1.

With reference to FIG. 5, the wave forms and associated timing of the signals occurring in circuit 10 during the above operation are shown in which the uppermost wave form depicts the differential signal form of the serial bit communication words as it exists on bus 16. Note that a synchronizing gap of a time width corresponding to four bit locations occurs between each successive 32-bit word. The first eight bits of each word, reading from left to right in FIG. 5, contain the encoded octal label of the associated word.

The next timing line in FIG. 5 shows the serial data in NRZ after processing by receiver 20 and as it appears at the data output 20a of the receiver. The third timing line down in FIG. 5 shows the stream of clock pulses, all of the same polarity, that have been extracted by receiver 20 from the differential serial bits on bus 16. The fourth timing line in FIG. 5 shows a wave form of a "one-shot" contained in receiver 20 and serving to detect the synchronizing gap between successive words by timing-out after a two bit time duration following the last differential bit at the end of a given word. When the "one-shot" in receiver 20 times out, a trailing edge (TE) occurs which defines the time that the synchronizing component is generated by receiver 20. The fifth timing line of FIG. 5 shows a synchronizing pulse signal from output 20c. The sixth line of FIG. 5 depicts the word ready signal generated by word detector 24 at output 24c and occurring at the end of each word after the counter of detector 24 has accumulated a count of 32 clock pulses. Word detector 24 is reset by the synchronizing pulse produced at output 20c.

With reference to FIGS. 4 and 5, the data bit stream from receiver output 20a in NRZ is introduced into the cascaded register sections 221-224 by the cooperative effects of the data and clock components shown on the second and third timing lines of FIG. 5 so that the lowest order bits of the word are first introduced into register section 221 and are progressively advanced through sections 222 and 223 to the last register section 224. As the first eight bits which correspond to the octal word label reach the last register section 224, the order of the bits is reversed as indicated in FIG. 4, such that instead of decreasing from left to right at the outputs of section 244, the bit order increases from left to right and is thus reversed relative to the parallel outputs for bit locations 9 through 32.

The purpose of reversing the order of the label bits is that the label is encoded such that the most significant bit (MSB) is in bit location number 1 and the least significant bit (LSB) of the label is at bit location eight, whereas in the data field, the MSB is at bit location 28 and the LSB is at bit location 11. Hence, to present the same ordering of bits, LSB to MSB, to data analyzer 12 to facilitate direct decoding of the label and data fields thereby, the order of the label bits at the output of conversion circuit 10 is reversed.

In another operating mode of the testing apparatus 8 of FIG. 1, oscilloscope 14 is connected at data display input 14b to receive the sequence of differential word bits on bus 16 and to display the associated wave form for selected words. This mode of operation can be used separately or in conjunction with the above operating modes of circuit 10 and data analyzer 12. To display the wave form of selected words on oscilloscope 14, label select switches 30 are set by an operator. A three-digit octal label set on switches 30 is encoded into an eight-bit binary label at outputs 30a and applied to one side of comparator 28. With reference to FIG. 5, a label detector 26 counts the first eight bits of each word arriving at receiver 20 and then produces a label detected output at 26c to enable the operation of comparator 28. The signal at output 26c enables comparator 28 to compare these initial eight bits that, in the meantime, have been loaded into the first section 221 (FIG. 4) of register 22 with the binary encoded eight-bit label set on switches 30. If comparator 28 senses a match of the selected label with the incoming word label, a trigger signal is produced at output 28b as shown in FIG. 5, occurring in response to the leading edge of an output signal at output 20c that enables comparator 28. This trigger signal appearing at comparator output 28b is applied to the scope trigger input 14a and the ensuing differential bit wave form on bus 16 applied in parallel to oscilloscope 14 at 14b is hence displayed. This feature is useful in examining the presence of wave form distortion of the signal on bus 16.

Figure 6:
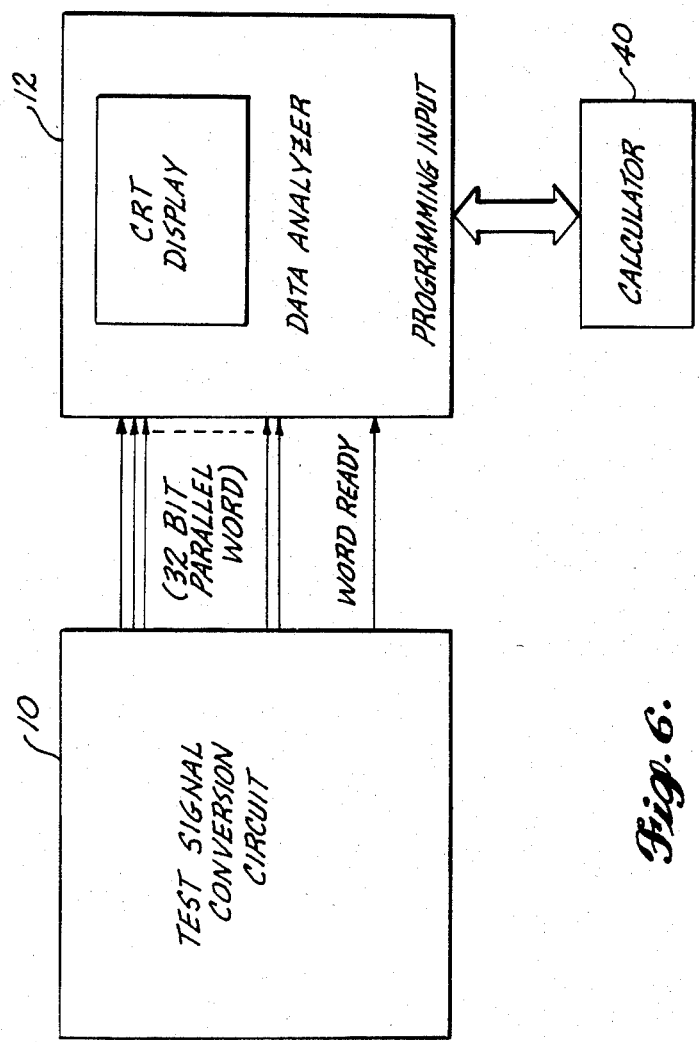
FIG. 6 is a generalized block diagram of an alternative test arrangement of the conversion circuit of FIG. 1.

With reference to FIG. 6, an alternative arrangement of conversion circuit 10 and data analyzer 12 is shown in which data analyzer 12 is augmented, in a manner known per se, by a calculator 40 that is programmed to receive word data stored in the memory of analyzer 12 and to preprocess such data prior to further decoding and displaying of same by the data analyzer. For example, a commercially available calculator having such programming capability is available as Model 9825 from the Hewlett Packard Company of Palo Alto, Calif.

One application of the alternative test arrangment shown in FIG. 6 is to program calculator 40 so as to decode a binary data field into angular values. For certain communication words in accordance with the ARINC 429 specification, the data field contains angular information and many data analyzers such as the one disclosed herein, cannot directly decode the binary data field into decimal angle values. Rather, the data field must be preprocessed in a manner known per se, by calculator 40, and then the processed data, in engineering notation (e.g., decimal angle values) returned to data analyzer 12 for displaying same on the CRT display. It will be appreciated that this particular use of conversion circuit 10 in conjunction with data analyzer 12 and a calculator 40, is but one of a number of uses of the computation capability of calculator 40 to preprocess the word data made available to analyzer 12 by conversion circuit 10.

While only particular embodiments have been disclosed herein, it will be readily apparent to persons skilled in the art that numerous changes and modifications can be made thereto including the use of equivalent means, devices and methods steps without departing from the spirit of the invention.

The embodiments of the invention in which an exclusive property or privilege is claimed are defined as follows:

1. In an apparatus for testing systems that communicate by transmission and reception of electrical communication words having a predetermined, binary encoded, serial bit format in which successive words are separated by a predetermined synchronizing time gap, a circuit for receiving and reformating said communication words for facilitating analysis thereof, comprising:
   signal receiving means having an input adapted to receive said communication words and including means for separating and outputting a serial data signal component and a clock signal component, said clock signal component representing a bit rate of said serial data signal component, and wherein said signal receiving means further includes means for detecting and separately outputting a sync signal component representing said synchronizing time gap between successive communication words;
   serial to parallel shift register means having a serial data input connected to said receiving means to receive said serial data signal component and said clock signal component, and having a plurality of parallel data outputs, one for each serial bit in said communication words, said serial to parallel shift register means further having a register section associated with a predetermined first subset of bits of said communication word and having means for reversing the serial order in said register section such that the corresponding parallel outputs present said first subset of data bits in a reverse order with respect to the order in which they are received by said serial to parallel shift register means; and
   word detector means having an input connected to said signal receiving means and including clock signal counting means for receiving and counting said clock signal component, said word detector means producing a word loaded signal in response to said counting means accumulating a predetermined count corresponding to the number of serial bits in said communication word, and wherein said counting means of said word detector means is connected to receive said sync signal component and is provided with count reset means that resets said counting means in response to said sync signal component, whereby the occurrence of said word loaded signal represents the condition of said shift register means in which said plurality of parallel outputs, including those corresponding to said register section containing the reversed ordered first subset of data bits, are ready with the reformatted, parallel data, communication word.

2. The apparatus set forth in claim 1 further comprising:
   a multibit label comparator means, a multibit label select switch means and a label bit counter means;
   said multibit label select switch means enabling independent selection of bit states corresponding to said first subset of data bits of said communication word, said first subset of data bits being associated with a label identification of the content of the associated communication word;
   said comparator means connected to certain of said parallel outputs of said shift register means and said label bit counter means cooperatively connected between said receiving means and said comparator means for causing said comparator means to compare, at said certain parallel outputs of said shift register means, said first subset of data bits of each communication word as received and loaded into said shift register means, with the status of said label select switch means, said comparator means having an output at which a trigger signal is produced in reponse to said comparator means detecting a match between said first subset of data bits in said communication word and the status of said label select switch means.

3. The apparatus set forth in claim 2 wherein said label bit counter means is connected to said signal receiving means for receiving said sync signal component, said label bit counter means including reset means for resetting the count accumulated therein in response to the receipt of said sync signal component.

4. The apparatus set forth in claim 3, wherein said label bit counter means includes means for causing said comparator means to compare the data on said certain parallel outputs with the status of said label select switch means in response to said label bit counter means accumulating a count corresponding to the total of said first subset of data bits that occur at the beginning of each successive communication word.

5. In the apparatus of claim 1, wherein said shift register means comprises a plurality of register modules, a first of said modules having a serial data input and a serial data output and a plurality of parallel bit outputs for registering therewithin said bits of said communication word, and a second module having a serial data input and a serial data output and a plurality of parallel bit outputs, said second module corresponding to said register section for registering said first subset of data bits of said communication word when said word is fully loaded in said shift register means, and wherein said serial data output of said first register module is so connected to serial data input of said second register module so that said second register module is loaded in reverse order with the first subset of data bits of said communication word relative to order of loading of said first module.

6. In the apparatus of claim 1 wherein said predetermined binary encoded serial bit format of said communication words is further characterized by each bit having a predetermined time width, and wherein said synchronizing time gap comprises a time duration at least as great as four times said predetermined bit time width.

7. In the apparatus of claim 1, the combination with said circuit for receiving and reformatting said communication words of a data analyzer having an input for receiving multiple parallel bits of data, said input connected to said parallel outputs of said shift register means, and said data analyzer further having a load command input, said load command input connected to said word detector means for receiving said word loaded signal, whereby a communication word that has been loaded into said shift register means is then transferred to said data analyzer means in response to said word detector.

8. In a method of testing systems that communicate by transmission and reception of electrical communication words having a predetermined binary encoded, serial bit format, a process for receiving and reformatting said communication words for facilitating analysis thereof, comprising:

receiving, in succession, said communication words and separating therefrom serial data bits representing information contained in each of said words, and also separating from said communications words a clock signal representing the bit rate and phase of said serial data bits, each said communication word having a first predetermined subset of data bits;

converting said serial data bits from serial data to parallel data by loading said serial data bits into a shift register at the rate and phase of said clock signal, and reversing the order of loading of said first subset of data bits;

detecting when a complete communication word has been loaded into said shift register by counting said clock signals and producing a word loaded indication signal when the number of counted clock signals corresponds to the number of serial bits in a complete communication word; and decoding said parallel data of each said communication words in a data analyzer in the order in which said data bits are loaded into said shift register.

* * * * *